Aug. 23, 1949.    LA VERNE B. RAGSDALE    2,479,965
SPRING CLUTCH
Filed Aug. 29, 1945    3 Sheets-Sheet 1
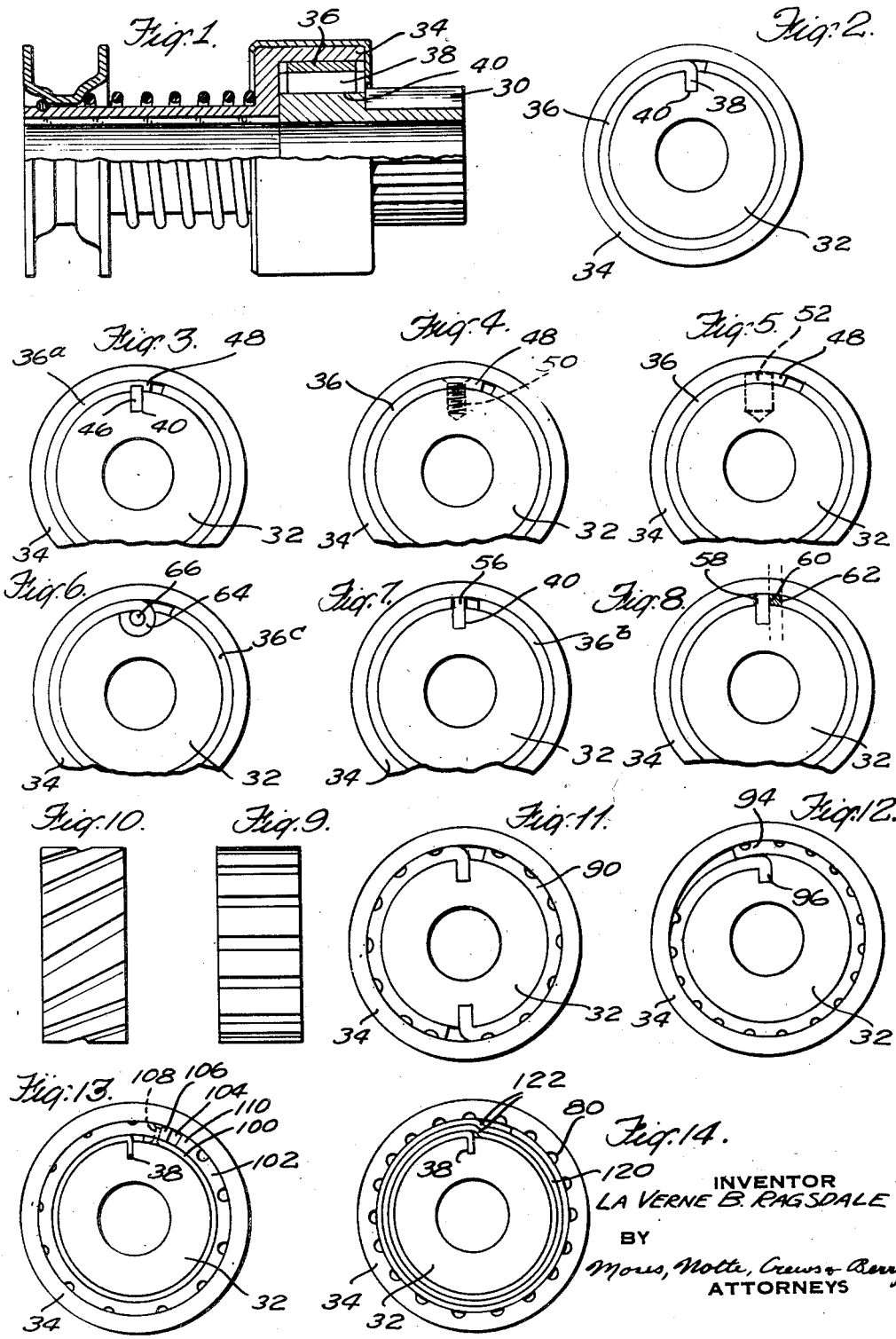
INVENTOR
LA VERNE B. RAGSDALE
BY
Moses, Nolte, Crews & Berry
ATTORNEYS

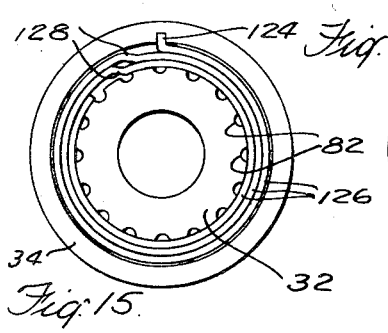
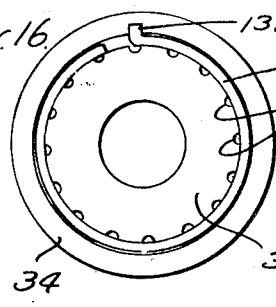
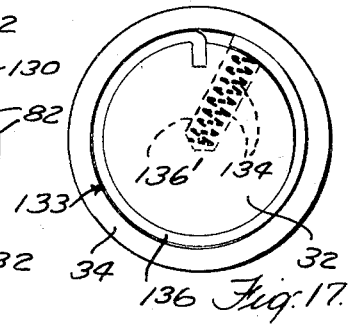
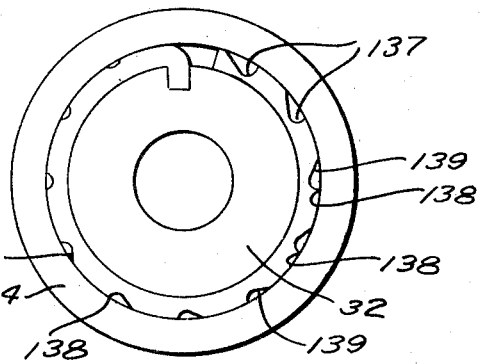
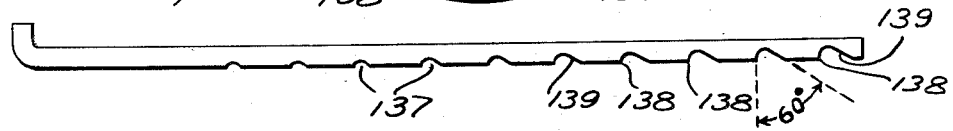
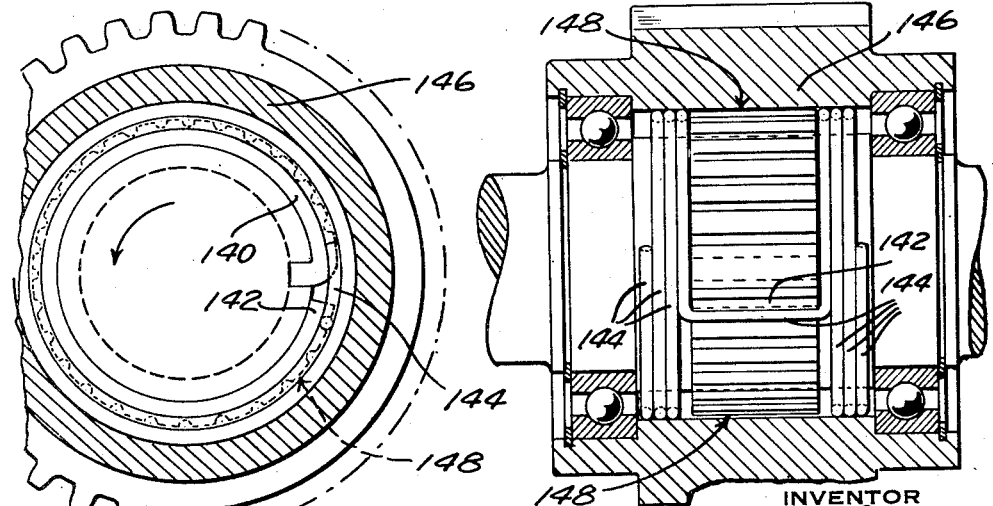

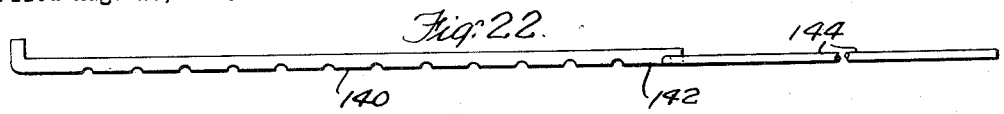
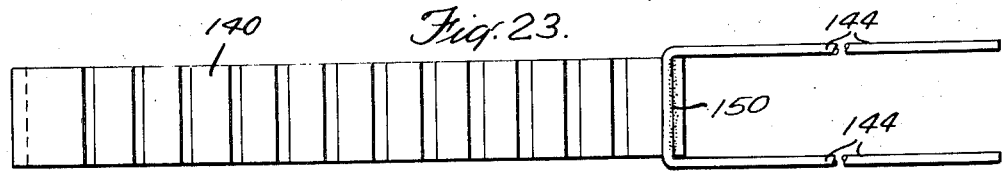
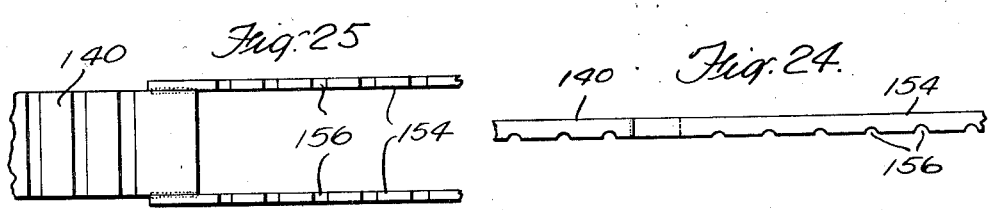
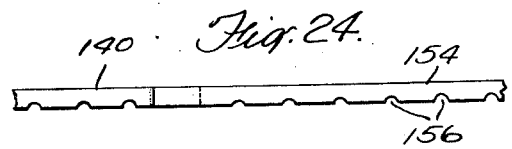
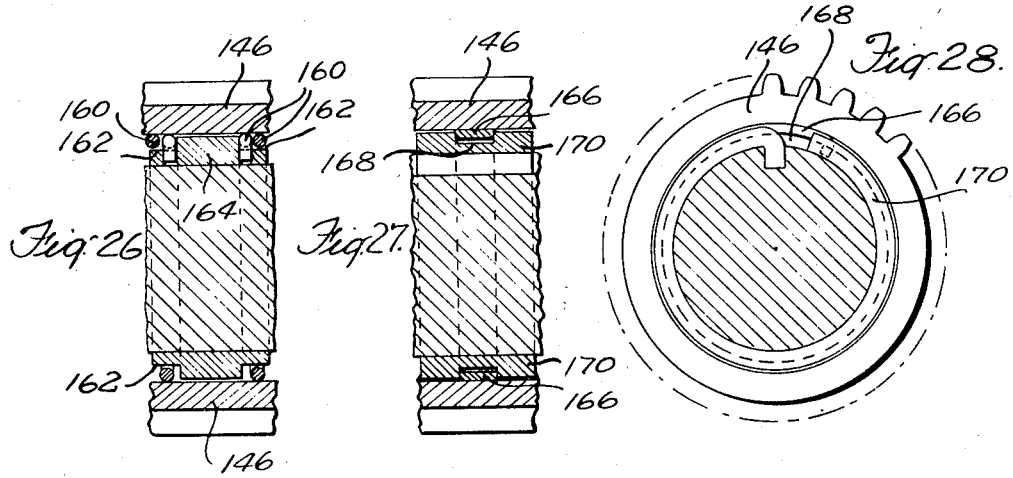
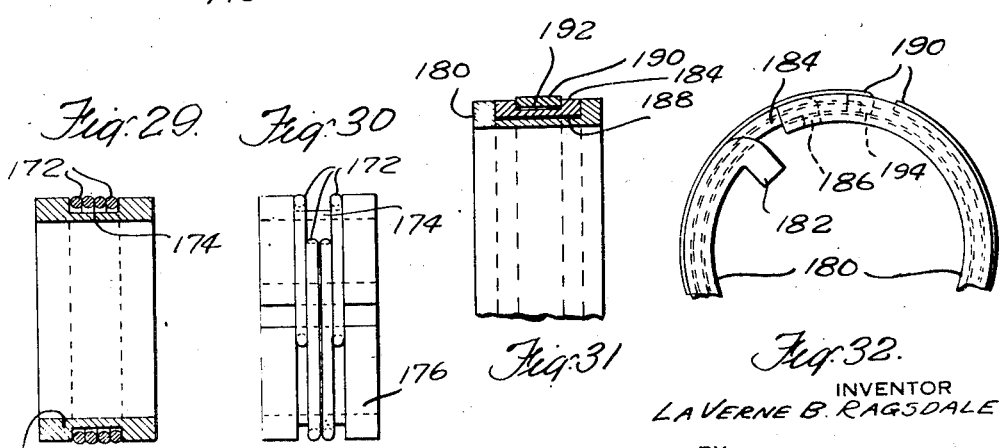

Patented Aug. 23, 1949

2,479,965

UNITED STATES PATENT OFFICE 2,479,965

SPRING CLUTCH

La Verne B. Ragsdale, New York, N. Y., assignor to Ragsdale and Company, New York, N. Y., a copartnership Application August 29, 1945, Serial No. 613,252

8 Claims. (Cl. 192—41)

This invention relates to automatic spring clutches and is applicable to overrunning or free wheeling clutches, indexing clutches, back stop clutches, or for other service where an automatic spring clutch may be used. Automatic spring clutches may be employed in many installations in place of pawl and ratchet mechanisms, cam and roller type clutches, and other one-way operating clutches, and possess advantages of quickness in taking hold and in releasing, absence of objectionable drag, firm grip in a driving direction, and freedom from danger of jamming, with certain and instant release when required.

Among the objects of the invention are to provide a clutch construction which embodies a minimum number of parts, which is simple and inexpensive in construction, is instantaneous and positive in action, will operate satisfactorily under both dry and oily conditions, and which is very compact and can be applied satisfactorily where space is limited.

Another object of the invention is to provide a spring clutch construction in which the spring extends through more than a complete circumference so as to provide for increased gripping action of the clutch.

Another object of the invention is to provide a construction in which the drag can be substantially eliminated or reduced to a minimum but in which the gripping action of the clutch is nevertheless instantaneous upon reversal of movement of the parts.

Other objects and advantages of the invention will be apparent from the description of certain preferred embodiments chosen to illustrate the principles of the invention.

In the accompanying drawings showing various preferred forms in which the invention may be embodied, Figure 1 is a view partly in side elevation and partly in longitudinal section of a typical automotive starter unit illustrative of one application of the invention;

Figures 2 to 7 inclusive are end elevations of various embodiments of the invention showing different ways of securing the end of the spring to one of the elements of the clutch;

Figure 8 is a similar view showing how the clutch and spring shown in Fig. 7 may be made;

Figure 9 is a side elevation of a clutch spring showing transverse oil grooves therein;

Figure 10 is a similar view of a clutch spring provided with helical oil grooves;

Figure 11 is an end elevation of a clutch provided with two semi-circular springs;

Figure 12 is a similar view of a clutch having a clutch spring with the ends overlapped;

Figure 13 is a similar view of a clutch showing a spring composed of two superimposed coils secured together;

Figure 14 is a similar view of a clutch having a multiple coil clutch spring and showing oil grooves in the external clutch member instead of in the spring;

Figure 15 is a view similar to Fig. 14 but showing the multiple coil clutch spring anchored to the outer member of the clutch and showing the oil grooves formed in the inner clutch member;

Figure 16 is a similar view showing a single coil spring anchored to the outer clutch member and having oil grooves on the inner clutch member;

Figure 17 is a similar view of a clutch having a spring so shaped as to provide clearance between it and the outer clutch member so as to reduce drag but provided with means for loading the free end of the spring to insure instant clutch engagement when necessary;

Figure 18 is a similar view of a clutch showing a spring provided with an improved form of oil groove;

Figure 19 is a view in elevation of the spring shown in Fig. 18 developed;

Figure 20 is a transverse sectional view of an indexing clutch provided with a clutch spring and an energizing spring for insuring instant engagement of the clutch;

Figure 21 is a longitudinal sectional view of the indexing clutch shown in Fig. 20;

Figures 22 and 23 are views in elevation and plan respectively of the clutch spring and energizing spring clutch shown in Figs. 20 and 21 respectively;

Figures 24 and 25 are views similar to Figs. 22 and 23 respectively, showing a modified construction of the clutch spring and energizing spring;

Figure 26 is a longitudinal sectional view of a clutch showing a modified form of clutch spring having energizing springs mounted in recesses in the clutch spring;

Figure 27 is a longitudinal sectional view showing another form of clutch spring having an energizing spring of flat section mounted in a recess therein;

Figure 28 is an end elevation of a clutch having the clutch spring and energizing spring construction shown in Fig. 27, the inner clutch member being shown in transverse section;

Figure 29 is a longitudinal sectional view of another form of clutch spring and energizing spring;

Figure 30 is a view in side elevation of the construction shown in Fig. 29;

Figure 31 is a longitudinal sectional view of a modified form of clutch spring;

Figure 32 is an end elevation of the clutch spring shown in Fig. 31.

Referring to the drawings in detail, Figure 1 shows an automotive starter unit which constitutes a typical device in which the clutch of the present invention may be embodied. The starter includes a pinion 30 which is connected to the internal member 32 of the clutch. The external member of the clutch is a sleeve 34 and in the space between the members 32 and 34 is the clutch spring 36. The end of the clutch spring is anchored to the member 32, a typical anchoring means being shown in Fig. 2 and consisting of the bent or hooked end 38 of the spring which is received in a slot or keyway 40 cut in the member 32. The operation of the clutch is very simple. When the inner clutch member 32 turns in a clockwise direction (Fig. 2) with respect to the outer clutch member, it drags with it the end 38 of the spring and thereby tends to wind up the spring more closely on the member 32. This contracts the spring and releases its frictional engagement with the inner surface of the member 34. Thus the member 32 can turn freely with respect to the member 34 in a clockwise direction. When the direction of relative rotation of the parts 32 and 34 is reversed so that the part 32 tends to move in a counter-clockwise direction with respect to the member 34, then pressure is put upon the hooked end 38 of the spring in a counter-clockwise direction and this tends to expand the spring 36 so as to cause it to bind within the sleeve member 34. As soon as the binding starts the pressure increases so that the spring immediately grips firmly against the inner surface of the clutch member 34 and the clutch members 32 and 34 and the clutch spring all rotate together as a unit in the counter-clockwise direction.

The use of the hooked end of the clutch spring fitting in a keyway, as shown in Figs. 1 and 2, is a very simple and effective anchorage for the end of the clutch spring.

Figure 3 shows another simple and effective way of anchoring the end of the clutch spring. In this case the end of the clutch spring 36a has a keyway 44 formed therein in which fits key 46 which is received in the keyway 40 in the clutch member 32. This construction avoids the bending over of the end of the spring as in the form of Fig. 2. As the driving pressure only comes on the key 46 when the latter is pushing against the length of the spring, away from the end of the spring in which the keyway 44 is formed, there is no heavy strain tending to break off the tip 48 of the spring beyond the keyway. That portion of the spring only has to carry a very slight drag on the spring when the clutch is free wheeling.

Figure 4 shows another method of anchoring the free end of the spring consisting in using the screw 50 screwed into a tapped hole in the member 32 and anchoring the end of the spring to the clutch member 32.

Figure 5 shows the end of the clutch spring anchored to the clutch member 32 by means of a pin 52 driven into a hole in the member 32.

In the various forms shown in Figs. 3, 4 and 5 the spring having no bent over parts may be machined and accurately ground to size while in the form of a continuous band or tube and may then be slit so as to provide a spring ring.

In Figure 6 another form of anchoring means for the end of the spring is shown which comprises a rolled portion 64 on the end of the spring 36c. The end of the spring if desired may be rolled about a pin 66 to give it extra strength and prevent the roll from being crushed. The rolled end of the spring is received in a semicircular recess 68 formed in the clutch member 32. This construction is very strong, as sharp bends and corners are avoided and the recess in the clutch member has a rounded bottom which prevents any stress concentrations. This method of anchoring the spring is suited for heavy duty where high torque loads must be carried.

Figure 7 shows a means of anchoring the end of the clutch spring 36b consisting in welding or otherwise securing a cap 56 on the free end thereof which fits in the keyway 40 in the clutch member 32. Figure 8 shows a convenient way in which this construction can be made. As here illustrated both ends of the spring are welded to the cap 56, as indicated at 58 and 60. The spring thus comprises a solid ring which may be ground to size. The spring is then completed by sawing out a section as indicated by the shading at 62 in Fig. 8.

It is in most cases desirable to provide oil grooves on the spring or on the surface which the spring engages so as to cut through any oil film which may be present and insure firm metal to metal contact between the clutch spring and the part which it is intended to grip. If the clutch operates under oily conditions or under conditions in which oily conditions may possibly obtain, the use of the oil grooves is important. If conditions are assured under which the parts are free from oil then the oil grooves may be omitted.

Figure 9 shows the outside of a clutch spring provided with transverse oil grooves. As these oil grooves are cut partly through the spring they tend to weaken the same to some extent and in cases where a heavy torque is encountered it may be desirable to make the oil grooves helical so that they extend diagonally or in screw fashion across the spring so as to overlap. In this way transverse zones of weakness are avoided and the springs will stand more tension. Such an arrangement of oil grooves is shown in Fig. 10. In some instances the oil grooves instead of being formed in the spring are formed in the surface which the spring is to grip, for instance in the inner surface of the outer member of the clutch, as shown at 80 in Fig. 14. Where the spring is arranged to bind against the inner member of the clutch then the oil grooves may be formed in the inner clutch member as shown at 82 in Figs. 15 and 16.

Figure 11 shows a clutch construction in which two separate spring clutch members 90 are used, each of which is anchored to the inner member of the clutch. These clutch members are shown as extending approximately half way around the circumference of the clutch. Obviously three or more clutch members may be used if desired.

Figure 12 shows a construction of clutch in which the free end 94 of the clutch spring overlaps the anchored end 96 of the spring. This construction is very strong as the free end of the spring prevents the anchored end from pulling out of its anchoring groove. Any tendency of the anchored end of the spring to pull out merely increases the binding pressure on the free end of the spring against the outer clutch member.

Figure 13 shows a double clutch spring comprising an inner band 100 anchored at one end to the inner clutch member in any suitable manner, as by hook portion 38. Surrounding the inner clutch spring is an outer spring 102 which is split at the point 104 and which has one end 106 secured to the free end of the inner spring 100 in any suitable manner, as by a rivet 108. The other end 110 of the outer spring is a free end merely resting upon the inner spring member 100 and capable of sliding movement with respect to the same. When the inner clutch member is rotated in a clockwise direction with respect to the outer clutch member, the tendency will be to contract the inner spring 100 which by reason of its connection with the end 106 of the outer spring will also tend to exert a contracting influence on such outer spring member thus freeing the clutch. When the inner member of the clutch is rotated in a counterclockwise direction with respect to the outer clutch member, then the inner spring 100 is expanded and this in turn exerts an expansive force on the outer spring both by the application of expansive pressure by the inner spring and by the circumferential force of the latter applied through the rivet 108 and tending to expand the outer spring. This causes the outer spring to grip the outer clutch member with an extremely firm grip, multiplying the effective action of the clutch. This gives the effect of a multiple turn engagement equal to $4\pi$ radians in turns.

Figure 14 shows a clutch having a multiple coil spring 120. This may be a spring like a clock spring, but the outer coils are preferably offset as indicated at 122 so as to maintain the outer circumference of the spring concentric. The inner end of the spring is provided with a hooked portion 38 or other means for anchoring it to the inner member of the clutch. When the clutch is operated in a direction to expand the spring a combined action due to the plurality of coils is secured. The gripping action of the clutch is equal to $6\pi$ radians in turns with the number of convolutions shown. When using a relatively thin spring of the clock spring type, as shown in Fig. 14, it may be undesirable to form the oil grooves in the spring and therefore oil grooves 80 are formed in the outer clutch member as already described.

Figure 15 shows a construction somewhat similar to Fig. 14 except that the clutch spring is anchored at its outer end as indicated at 124 to the outer clutch member. The clutch spring winds upon and grips the inner clutch member when the inner clutch member rotates in a clockwise direction with respect to the outer clutch member. In this construction as the spring is thin the oil grooves 82 are formed in the outer surface of the inner clutch member instead of in the spring as already described. In the construction shown the spring 126 is formed with offsets 128 for the purpose of making the spring concentric.

Figure 16 shows a simple one convolution spring 130 anchored to the outer clutch member at 132 instead of to the inner clutch member as in Fig. 2 for example. In this construction the inner clutch member is also shown as provided with the oil grooves 82, as described above.

Figure 17 shows a clutch construction in which the free end of the spring is loaded in such a way as to cause only the such loaded free end to contact the outer clutch member during free wheeling. In this construction the clutch spring 136 is shaped to fit freely within the outer clutch member 34 so as to provide a slight clearance indicated at 133. The free end of the spring 136 is loaded by being forced outwardly by means of a coil spring 134 mounted in a recess 136' in the clutch member. This spring 134 while holding the free end of a clutch spring 136 in contact with the inner surface of the outer clutch member 34, also displaces the clutch spring 136 so that it is entirely free from contact with the inner surface of the outer clutch member except adjacent to its free end. This results in decreasing the drag of the clutch when free wheeling. However, when the clutch is reversed in direction the friction of the loaded free end of the clutch spring is sufficient to cause the clutch spring to grip the outer clutch member instantly, expand the clutch spring and put the clutch into effective operation.

Figures 18 and 19 show a clutch spring provided with an improved form of oil groove 137 in which the walls of the grooves on the side towards the fixed end of the spring have sharp edges 138 for cutting through the oil film. These walls of the grooves are preferably approximately radial with respect to the clutch surface. The opposite walls 139 of the oil grooves, namely those nearest to the free end of the spring, are inclined at a considerable angle to the radial, as shown, at an angle of 60°. Thus when the clutch is free wheeling the 60° side of the groove becomes active and this does not cut and destroy the oil film. Thus the oil film will be destroyed when the clutch is in clutching engagement but will be at least partly preserved when the clutch is free wheeling, thereby lubricating the clutch during free wheeling and decreasing the drag. This construction can be applied to helical oil grooves as well as to transverse grooves. Figs. 18 and 19 also show the grooves varying in depth, the grooves being shallowest adjacent to the fixed end of the spring and gradually increasing in depth towards the free end of the spring. This results in decreasing the bending moment of the spring from the anchored end towards the free end, giving a similar effect so far as flexibility of the spring is concerned to that which would be produced if the spring were tapered in thickness.

Figures 20 and 21 show a construction of clutch in which the main load carrying clutch spring can be so shaped as to provide a clearance so as to prevent drag when the clutch is free wheeling. Means are provided however to energize the load carrying spring, so to speak, so as to insure that the clutch will instantly engage upon reversal of the direction of movement. Such instant engagement is important, particularly for an indexing clutch. Ordinarily indexing clutches in order to avoid any blacklash have been made with close tolerances. While this accomplished the accurate indexing function it also produced substantial and objectionable drag. The construction shown in Figs. 20 and 21 avoids this objection. As here illustrated the main clutch spring 140 has attached to its free end 142 one or a pair of energizing springs 144 which are light and flexible compared to the spring 140, but which are so formed as to contact at all times with the outer clutch member 146. The main spring 142 is so shaped that when the clutch is free wheeling it is out of engagement with the outer clutch member. A distinct clearance 148 is preferably provided between the two as shown. Thus there is no drag between the main spring and the outer clutch member. Owing to the fact that the springs 144 are very flexible, the drag caused by these springs is so slight as to be negligible. Nevertheless upon reversal of the clutch the drag of the springs 144 is sufficient to cause those springs to expand and these in turn expand or energize the main spring until the latter comes into gripping engagement with the outer clutch member. When this takes place the main spring binds tightly and the outer clutch member is effectively driven. The energizing springs 144 act instantly as they are constantly in contact with the outer clutch member so that there is practically no backlash or lost motion in the clutch.

Figures 22 and 23 show the main spring and energizing spring of the form shown in Figs. 20 and 21 developed. In this form the energizing spring is illustrated as a single piece of spring wire bent into a U-shape and welded in a groove in the end of the main spring, as indicated at 150. The arms of the energizing spring are shown (Fig. 21) as long enough to make a plurality of coils but obviously they might be of such length as to make only one or a part of a coil.

Figures 24 and 25 show a modified construction of energizing springs in which the energizing springs are flat pieces 154 welded, brazed, riveted, or otherwise secured to the end of the main spring 140. These flat energizing springs are shown as provided with oil grooves 156.

Figure 26 shows a form of clutch spring with energizing springs attached thereto, somewhat similar to the construction shown in Figs. 20 and 21. In the construction shown in Fig. 26, however, the energizing springs 160 are received in recesses 162 formed at the sides of the clutch spring 164.

In the construction shown in Figs. 27 and 28 an energizing spring 166 of flat section is provided which is mounted in a recess 168 in the center of the face of the clutch spring 170. The action of this energizing spring is similar to that of the energizing springs of the forms described above.

In Figures 29 and 30 a construction somewhat similar to that shown in Figs. 27 and 28 is provided, except that in place of the flat energizing spring 166 a pair of annular wire engaging springs 172 are provided which are mounted in a recess 174 in the face of the clutch spring 176.

Figures 31 and 32 show a clutch spring construction in which the main clutch spring comprises a multiple coil and is also provided with an energizing spring. The main member of the clutch spring comprises a band 180 which may be attached to the cylindrical clutch member (not shown) in any suitable manner as by means of a bent end 182 adapted to be received in a slot in the clutch member. To the free end of the band 180 is attached a supplementary clutch spring 184 which is shown as having a bent end 186 fitting in a slot in the free end of the band 180. The supplementary spring 184 is received in a recess 188 in the band 180. The action of the band 180 and the supplementary spring 184 is somewhat similar to that of the construction shown in Fig. 13 but differs in the fact that when the clutch is driving portions of the surfaces of both the band 180 and supplementary spring 184 contact the inner surface of the outer clutch member so as to exert a direct clutching action thereon. The construction shown in Figs. 31 and 32 is also provided with an energizing spring 190 which is attached to the free end of the supplementary clutch spring 184 and is received in a recess 192 in the supplementary spring. As shown the energizing spring 190 is provided with a bent end 194 which is fitted in a slot in the end of the supplementary spring. With this construction the energizing spring 190 first takes hold of the clutch member when the direction of movement is reversed, and acts to expand the supplementary spring 184 which will next grab the clutch surface and it in turn will expand the main clutch spring or band 180 and cause that to take hold. Thus the supplementary spring 184 acts both as an energizing spring for the main clutch spring and as a supplemental clutch spring.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever forms its principles may be embodied.

What is claimed is:

1. An automatic spring clutch comprising inner and outer clutch members and a clutch spring between said members anchored at one end to one of said members and adapted to be deformed into gripping engagement with the other of said members for one direction of relative rotation of said members and to be free from gripping engagement for the other direction of relative rotation, and an energizing spring attached to the free end of said clutch spring and bearing against the gripping surface of the clutch member adapted to be gripped by the gripping surface of the clutch spring, said energizing spring adapted to firmly grip said clutch surface on relative rotation of the clutch members in driving direction and to be thereby caused to exert force on the free end of the clutch spring tending to deform said spring into gripping engagement with the cooperating gripping surface of the clutch member.

2. An automatic spring clutch comprising inner and outer clutch members and a clutch spring between said members anchored at one end to one of said members and adapted to be deformed into gripping engagement with the other of said members for one direction of relative rotation of said members and to be free from gripping engagement for the other direction of relative rotation, and an energizing spring of light weight relative to the clutch spring attached to the free end of the clutch spring and extending beyond the same circumferentially between the inner and outer clutch members, and bearing against the gripping surface of the clutch member adapted to be gripped by the gripping surface of the clutch spring.

3. An automatic spring clutch comprising inner and outer clutch members, a clutch spring between said members anchored to one of said members and adapted to be deformed into gripping engagement with the other of said members for one direction of relative rotation of said members, and to be free from gripping engagement for the other direction of relative rotation, said clutch spring having an annular recess in its gripping face, and an energizing spring of light weight relative to the clutch spring attached to the free end of the clutch spring and lying in said recess in the face of the clutch spring.

4. An automatic spring clutch as claimed in claim 3 in which the energizing spring is a thin flat band lying in a recess between the edges of the main clutch spring.

5. An automatic spring clutch comprising an inner clutch member, an outer sleeve member, and a compound clutch spring mounted between the same, said clutch spring comprising a transversely split spring member having an annular recess in its clutching face and a transversely split auxiliary clutch spring lying in its recess, said auxiliary clutch spring having its trailing end in the direction of drive attached to the free end of the main clutch spring.

6. An automatic spring clutch comprising an inner clutch member, an outer sleeve member, and a compound clutch spring mounted between the same, said clutch spring comprising a transversely split spring member having an annular recess in its clutching face and a transversely split auxiliary clutch spring lying in said recess, said auxiliary clutch spring having its trailing end in the direction of drive attached to the free end of the main clutch spring, said auxiliary clutch spring having a recess in its face and an energizing spring mounted in said recess, said energizing spring having its trailing end in the direction of drive attached to the free end of the auxiliary clutch spring.

7. A compound clutch spring for spring clutches comprising a transversely split main load carrying spring and a transversely split auxiliary clutch spring surrounding said main load carrying spring, said auxiliary clutch spring having its trailing end in the direction of drive attached to the free end of the main load carrying spring, said main load carrying spring having a recess in its bearing surface in which said auxiliary load carrying spring is received.

8. A clutch spring as claimed in claim 7 in which the auxiliary spring has an energizing spring attached to its free end and extending circumferentially thereof.

LA VERNE B. RAGSDALE.

REFERENCES CITED

The following references are of record in the file of this patent:

UNITED STATES PATENTS

| Number | Name | Date |
|---|---|---|
| 1,055,905 | Hansen | Mar. 11, 1913 |
| 1,303,502 | Rundell et al. | May 13, 1919 |
| 1,553,515 | Dennison | Sept. 15, 1925 |
| 1,964,310 | Bethenod | June 26, 1934 |
| 2,044,420 | Collyear | June 16, 1936 |
| 2,300,712 | Starkey | Nov. 3, 1942 |
| 2,336,757 | Starkey | Dec. 14, 1943 |

FOREIGN PATENTS

| Number | Country | Date |
|---|---|---|
| 371,314 | Germany | Mar. 13, 1923 |